UNITED STATES PATENT OFFICE.

WALTER MIEG, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GRAY ANTHRAQUINONE DYE.

960,182.  Specification of Letters Patent.  Patented May 31, 1910.

No Drawing.  Application filed August 19, 1909. Serial No. 513,652.

*To all whom it may concern:*

Be it known that I, WALTER MIEG, doctor of philosophy, chemist, citizen of the German Empire, residing at Elberfeld, Germany, have invented new and useful Improvements in Gray Anthraquinone Dyes, of which the following is a specification.

I have found that alpha-alpha-anthrimids which are obtained by condensing alpha-aminoanthraquinones with chloroanthraquinones yield upon conversion into new nitro-compounds on treatment with reducing agents new dyestuffs capable of forming vats from which unmordanted cotton can be dyed in fast gray shades. The new products are dark powders, coluble with difficulty in quinolin, and form vats with hydrosulfite and caustic soda lye, which vats dye unmordanted cotton gray shades.

10 parts of alpha-alpha-dianthrimid (obtainable from alpha-aminoanthraquinone and alpha-chloroanthraquinone) are introduced into 80 parts of a 95 per cent. nitric acid which has to be continually stirred. The imid enters first in solution while the temperature of the mixture rises, but after a short time the nitro product separates in the shape of orange crystals which are filtered off, washed with cold water and dried. Instead of $HNO_3$ other nitrating agents may be used. The new nitro product thus obtained forms orange colored crystals, rather easily soluble with orange color on warming in organic solvents of high boiling point, such as nitro benzol and anilin; on warming with pyridine a compound is formed which crystallizes out, very difficultly soluble in concentrated sulfuric acid but soluble in fuming acid of 30% $SO_3$ with olive green color, furnishing on boiling with strong caustic soda lye a dark colored solution from which the nitro-compound cannot be separated any more.

A solution of 60 parts of sodium sulfid ($Na_2S$) is added to 20 parts of the nitro-compound of alpha-alpha-dianthrimid suspended in water and the resulting mixture is heated to boiling. After boiling for a short time the dyestuff is filtered off and washed with hot water. It is a greenish-black crystalline powder scarcely soluble in organic solvents. Its solution in concentrated sulfuric acid is green, which color turns violet by the addition of formic aldehyde. It is soluble in boiling quinolin with a green color. On treatment with alkaline reducing agents the new product forms an olive-brown "vat" from which unmordanted cotton can be dyed in fast greenish-gray shades. The process is carried out in an analogous manner on starting from other alpha-alpha-anthrimids e. g. from product obtained by condensing one molecule of 1.5- or 1.8-diaminoanthraquinone with two molecules of alpha-chloro-anthraquinone. The color resulting from these anthrimids dye cotton grayish shades.

I claim:

1. The herein described vat dyes, obtainable by preparing nitro-alpha-alpha-anthrimids and treating the nitro-compounds thus produced with reducing agents, which are after being dried and pulverized dark powders soluble with difficulty in quinolin and forming vats with hydrosulfite and caustic soda lye, which vats dye unmordanted cotton gray shades, substantially as described.

2. The herein described vat dye, obtainable by nitrating alpha-alpha-dianthrimid and reducing the nitro-compound thus produced, which dye is after being dried and pulverized a greenish-black powder scarcely soluble in organic solvents, soluble in concentrated sulfuric acid with a green color which turns violet by the addition of formic aldehyde and forming an olive-brown vat with hydrosulfite and caustic soda lye, which vat dyes unmordanted cotton fast greenish-gray shades, substantially as described.

In testimony whereof I have hereunto set my hand in the presence of two subscribing witnesses.

WALTER MIEG. [L. S.]

Witnesses:
 OTTO KÖNIG,
 WILLY KLEIN.